Jan. 6, 1953 T. E. FINSTEAD 2,624,104
METHOD OF ASSEMBLING BALL BEARING WHEEL STRUCTURES
Filed April 6, 1948
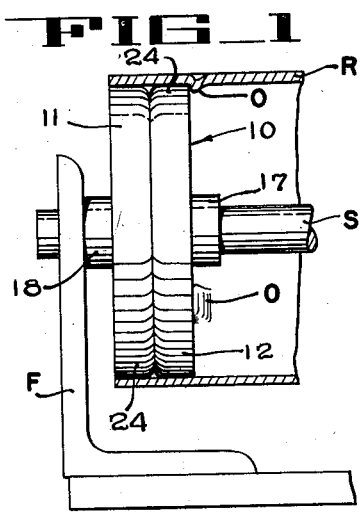
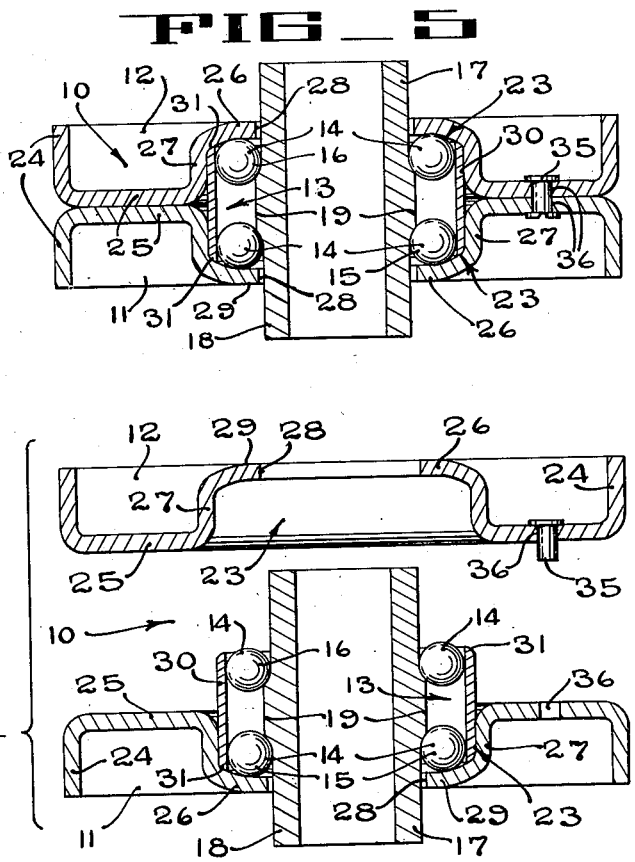
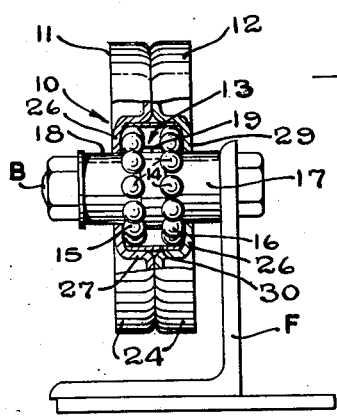
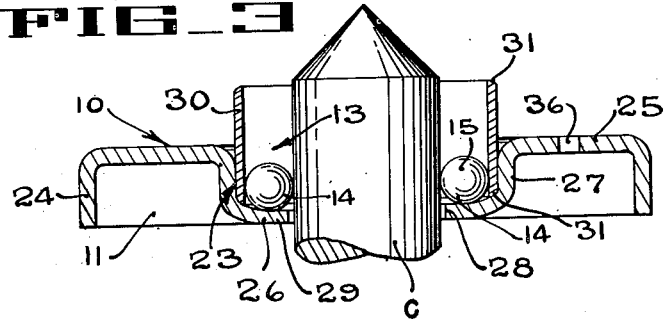
INVENTOR
THERON E. FINSTEAD
BY Philip A. Minnis
Hans G. Hoffmeister
ATTORNEYS Patented Jan. 6, 1953

2,624,104

UNITED STATES PATENT OFFICE 2,624,104

METHOD OF ASSEMBLING BALL BEARING WHEEL STRUCTURES

Theron E. Finstead, San Jose, Calif., assignor to Food Machinery and Chemical Corporation, a corporation of Delaware Application April 6, 1948, Serial No. 19,414

2 Claims. (Cl. 29—148.4)

This invention relates to improvements in ball bearing structures and to a novel method of making the same.

It is one object of this invention to provide a simple bearing structure which is inexpensive to manufacture and highly efficient in use in connection with conveyor rollers, wheels, and pulleys, or the like.

Another object is to provide a hardened steel outer race insert for a ball bearing wheel structure.

Another object is to provide an outer race insert which will lend itself to a simplified mode of assembling ball bearing structures.

Another object is to provide a method of assembling ball bearing structures by a series of direct steps without the necessity of inverting any sub-structure thereof to thereby minimize upsetting the same during assembly.

Another object is to provide a method of assembling ball bearing structures in a facile manner.

Another object is to provide a method of assembling multi-grouped balls in a bearing structure in a manner lending itself to assembly by an automatically operable apparatus.

Other objects and advantages of the present invention will become apparent from the following description in connection with the drawings in which:

Fig. 1 is a section through one end of a conveyor roller embodying the present invention.

Fig. 2 is an elevation of a conveyor wheel also embodying the present invention and shown partly in section for purposes of illustration.

Fig. 3 is an enlarged section of a portion of a conveyor wheel showing the first step in the assembly of the wheel.

Fig. 4 is a section similar to that of Fig. 3 illustrating the several parts of the conveyor wheel in another stage of assembly.

Fig. 5 is a section through the complete conveyor wheel after the last step in the assembly thereof.

The conveyor wheel or roller bearing 10 of the present invention generally comprises a pair of identical discs or wheel sections 11 and 12 interlocked with respect to each other to provide a housing 13 within which a plurality of balls 14 are confined in annular rows 15 and 16 around an inner race or cone 17 forming a mounting hub 18 for the wheel.

The inner race or cone 17 is provided with an intermediate annular shoulder 19 having coved portions against which the two rows of balls 14 are held and this cone is cyanide hardened to a degree approximating the hardness of the steel balls 14.

The hub 18 is adapted to be mounted on a suitable axle, such as a shaft S (Fig. 1) or a stud bolt B (Fig. 2), either of which is supported by, and secured to, one flange F of an angle iron forming a part of a conveyor frame.

When the bearing 10 of the present invention is used in connection with a wheel type conveyor (Fig. 2) it will be apparent that a plurality of such wheels may be arranged adjacent each other for supporting objects, such as boxes. The wheels are also adapted to be utilized for supporting the ends of tubular rolls R and a plurality of rolls R arranged side by side form a roller conveyor. From the illustration in Fig. 1, it will be noted that the open ends of the rolls R are press fit over the periphery of the wheels and are secured thereto by insets O formed in the tubular rolls to prevent lateral shifting of the rolls with respect to the wheels.

The wheel sections 11 and 12 are similarly formed by stamping them out of sheet metal blanks. These sheet metal blanks are stamped to provide a central recess portion 23 and an annular felly 24 divided by a flat web 25. The web 25 is spaced from the base 26 of the recess portion 23 by an annular rim 27, the base 26 being disposed at right angles to the rim 27 and parallel to the web 25. The base 26 of the recessed portion 23 is provided with a hole 28 of sufficient diameter to leave a clearance between the remaining portion of the base 26 and the extremity of the hub 18 which extends through the hole 28. The remaining portion of the base 26 provides an annular flange 29 for retaining a row of balls adjacent the same within the housing 13 which is provided by the recessed portions 23 of the wheel sections 11 and 12 when they are juxtaposed opposite each other.

It has heretofore been the practice to arrange the two rows 15 and 16 of balls 14 for bearing engagement against raceways provided by the concave seat formed between the flanges 29 and the annular rim 27 in the respective wheel portions 11 and 12. However, since the discs 11 and 12 are preferably stamped from sheet material, they are considerably softer than the steel balls 14 and, consequently, the latter will cause the raceways to be worn away with such rapidity as to render the bearing structure inefficient within a relatively short period of time.

The present invention contemplates the use of a hardened steel lining between the annular rims 27 and the hardened steel balls 14. This hardened steel lining is preferably in the form of a cylindrical ring 30 which is cut from seamless steel tubing in lengths sufficient to fit snugly between the two base portions 26 of the wheel sections 11 and 12 when they are juxtaposed opposite each other. The flanges 29 are, therefore, formed to provide a concave parabolic surface merging with the inner periphery of the rim 27 to receive the ends of the ring 30 which are ground to provide rounded edges 31 adapted to fit snugly against the respective concavities of the flanges 29. After all burrs are removed from the ring 30 it is cyanide hardened in a manner well known in the art so as to withstand wear during continuing engagement with the steel balls 14.

It will be noted that the rim 27 of each of the recessed portions 23 provides an annulus against which the ring 30 is seated. Consequently, the ring 30 will be maintained in axial alignment with the assembled wheel sections 11 and 12 and provide a firm outer race for the two rows 15 and 16 of balls 14 of the bearing structure. In addition to providing a hardened steel outer race in the desired position within the housing 13, the ring 30 is also advantageously employed during assembly of the bearing structure.

The method of assembly provided for by the present invention is illustrated in steps in Figs. 3 through 5. The first step in the assembly is shown in Fig. 3 in which one wheel section 11 is disposed, recessed portion up, on a suitable surface permitting a centering pin C to extend upwardly through the hole 28 of the section 11. Half of the outer race ring 30 is then disposed within the recessed portion 23 and a plurality of balls 14 is arranged between the pin C and the ring 30 to provide one annular row 15 of balls of the bearing structure. The hardened steel cone 17 is then disposed in axial alignment with the centering pin C and the latter replaced by the cone. It will be apparent that the cone 17 may be employed to force the centering pin C downwardly or that the pin C may be withdrawn while the cone is simultaneously lowered into place. In this manner, the row of balls 15 is not displaced during removal of the centering pin or during placement of the cone 17, and, consequently, the balls 14 become nested in the lower coved portion of the annular shoulder 19 intermediate the ends of the cone (see Fig. 4).

The other row of balls 16 is arranged in the open upper end of the ring 30 with the balls 14 seated upon the upper coved portion of the annular shoulder 19 of the cone 17. The opposite wheel section 12 is then lowered into position, recessed portion down, as illustrated in Fig. 4, until the web 25 of the wheel section 12 lies against the web of the wheel section 11. The assembled structure is now disposed in the fashion shown in Fig. 5 in which condition the two wheel portions are secured together in any suitable manner, for instance, by a number of rivets 35.

The rivets 35 are suitably spaced around the webs 25 of the wheel sections 11 and 12 and extend through aligned holes 36 provided therein. While the two wheel sections are held together firmly, the free ends of the rivets 35 are peened to secure the wheel sections in abutting relation. It is apparent that the wheel sections may be secured together by spot welding, or that tabs may be struck from one web 25 to extend through openings in the other web, provided that the ends of such tabs are long enough to be bent over for securing the two wheel sections in juxtaposition opposite each other.

From the foregoing, it will be observed that a minimum number of steps are required in assembling the wheel bearing structure herein illustrated and it should be noted particularly that the parts are assembled directly one upon another without necessity of any sub-assembly thereof being inverted during the assembling operations. This results in a saving in labor with an inherent lowering of the cost of manufacture of wheel bearings. Moreover, since no sub-assembly of the bearing structure need be inverted while practicing the present mode of assembly, the same lends itself to being performed by automatically operable apparatus. In addition to the foregoing, the hub, balls, and outer race are equally hardened and, therefore, the wheel structure produced thereby is durable and will withstand considerable wear during use.

While the present invention has been described in detail, it is not desired to limit the same to the specific construction herein disclosed or to the precise mode and practice of the method set forth above other than is compatible with changes or modifications coming within the purview of the appended claims.

What I claim as new and desire to protect by Letters Patent is:

1. The method of assembling a ball bearing wheel structure including a pair of wheel sections each having a hole, an outer race ring of greater width than the holes in said wheel section, an inner race cone provided with a shoulder intermediate its ends, and a plurality of balls; which method comprises placing a first wheel section in a substantially horizontal position with the axis of its hole arranged substantially vertical, supporting the outer race ring with its axis substantially vertical on the upper side of said first wheel section around the hole therein, arranging a ball centering pin having a conical upper end vertically within said outer race ring, positioning a first row of balls on the first wheel section in the space between the outer race ring and the centering pin, withdrawing the centering pin downwardly through the hole in said first wheel section while simultaneously inserting the shouldered inner race cone from above in its stead and with its lower end centered on said conical upper end of the centering pin until the underside of the shoulder on the inner race cone rests upon said first row of balls, positioning a second row of balls on the upper side of the inner race cone shoulder in the raceway defined by the outer race ring and the inner race cone, covering the second row of balls and the outer race ring with the second wheel section and securing the two wheel sections together.

2. The method of assembling a ball bearing wheel structure including a pair of wheel sections possessing a central recess having a base portion provided with a central hole in such a manner as to leave a flange surrounding the hole, and outer race ring of greater width than the holes in the central recesses and adapted to seat in said recesses, an inner race cone formed with a radially protruding shoulder intermediate its ends, and a plurality of balls; comprising positioning a first wheel section in a substantially horizontal position with its recess facing upwardly, seating said outer race ring in the recess of said first wheel section with its axis substantially vertical, arranging a ball centering pin having a conical upper end vertically within the hole in the recess of said first wheel section and within said outer race ring, inserting a first row of balls from above into the space between the centering pin and said outer race ring for said balls to rest on said base portion flange of the first wheel section recess, placing said inner race cone in abutting axially aligned and centered relationship with the upper conical end of the centering pin, forcing said centering pin downwardly by means of said cone to replace said pin by said cone and to position said cone within the outer race ring and to bring the lower face of the shoulder of said inner race cone into contact with said first row of balls to retain them in the raceway defined by the portion of the inner race cone below its shoulder and the outer race ring and said base portion flange on the first wheel section recess, inserting a second row of balls in the space above the inner race cone shoulder between said inner race cone and the outer race ring, placing the second wheel section over the first wheel section with the recess of said second wheel section enclosing the outer race ring and the second row of balls, and securing the first and second wheel sections together.

THERON E. FINSTEAD.

REFERENCES CITED

The following references are of record in the file of this patent:

UNITED STATES PATENTS

| Number | Name | Date |
| --- | --- | --- |
| 656,016 | Donahue | Aug. 14, 1900 |
| 1,482,579 | Nice | Feb. 5, 1924 |
| 1,674,087 | Beemer | June 19, 1928 |
| 1,813,944 | Marshall | July 14, 1931 |
| 1,840,638 | Scribner | Jan. 12, 1932 |
| 1,909,748 | Bohn | May 16, 1933 |
| 1,947,004 | Goddard | Feb. 13, 1934 |
| 2,127,149 | Whitney | Aug. 16, 1938 |
| 2,215,134 | Rehnberg | Sept. 17, 1940 |
| 2,500,886 | Torkelson | Mar. 14, 1950 |